US008982124B2

(12) United States Patent
Li et al.

(10) Patent No.: US 8,982,124 B2
(45) Date of Patent: Mar. 17, 2015

(54) LOAD BALANCING AND MERGING OF TESSELLATION THREAD WORKLOADS

(71) Applicants: Yunjiu Li, Santa Clara, CA (US); Michael Green, Santa Clara, CA (US)

(72) Inventors: Yunjiu Li, Santa Clara, CA (US); Michael Green, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 13/631,865

(22) Filed: Sep. 29, 2012

(65) Prior Publication Data

US 2014/0092091 A1   Apr. 3, 2014

(51) Int. Cl.
*G06T 15/50* (2011.01)
*G06T 17/20* (2006.01)

(52) U.S. Cl.
CPC ............. *G06T 17/20* (2013.01); *G06T 2200/28* (2013.01); *G06T 2210/52* (2013.01)
USPC ........................................................ 345/426

(58) Field of Classification Search
None
See application file for complete search history.

(56) References Cited

U.S. PATENT DOCUMENTS

| 7,584,342 B1* | 9/2009 | Nordquist et al. ............... 712/22 |
| 7,634,637 B1* | 12/2009 | Lindholm et al. ............... 712/22 |
| 8,225,325 B2* | 7/2012 | Munshi et al. ................. 718/104 |
| 2004/0226011 A1* | 11/2004 | Augsburg et al. ............. 718/100 |
| 2007/0091089 A1* | 4/2007 | Jiao et al. ...................... 345/426 |
| 2008/0184211 A1* | 7/2008 | Nickolls et al. ............... 717/140 |
| 2010/0118028 A1 | 5/2010 | Pallister |
| 2010/0123717 A1* | 5/2010 | Jiao ................................ 345/426 |
| 2010/0146162 A1 | 6/2010 | Wagh et al. |
| 2010/0214294 A1 | 8/2010 | Li et al. |
| 2014/0019723 A1* | 1/2014 | Yamada et al. ............... 712/208 |

OTHER PUBLICATIONS

Ricardo Marroquim et al., "Introduction to GPU Programming with GLSL," 2009, 14 pages.
"Intel® OpenSource HD Graphics, Programmer's Reference Manual (PRM), vol. 1 Part 1: Graphics Core (SandyBridge)," May 2011, Revision 1.0, 130 pages, Intel Corporation.
"Intel® OpenSource HD Graphics, Programmer's Reference Manual (PRM), vol. 1 Part 3: Graphics Core—Memory Interface and Commands for the Render Engine (SandyBridge)," May 2011, Revision 1.0, 132 pages, Intel Corporation.
"Intel® OpenSource HD Graphics, Programmer's Reference Manual (PRM), vol. 4 Part 1: Subsystem and Cores—Shared Functions (SandyBridge)," May 2011, Revision 1.0, 282 pages, Intel Corporation.
Natalya Tatarchuk, "Future-Proof Games with Real-Time Tessellation," Game Developer's Conference, Feb. 18-22, 2008, www.gdconf.com, 54 pages.

* cited by examiner

*Primary Examiner* — Edward Martello
(74) *Attorney, Agent, or Firm* — Blakely, Sokoloff, Taylor & Zafman LLP

(57) ABSTRACT

In one embodiment described herein, a graphics engine with shader unit thread load balancing functionality executes shader instructions from multiple execution threads in a smaller number of execution threads by combining instructions from multiple threads at runtime. In one embodiment, multiple shader unit threads containing less than a minimum number of instructions are combined to minimize the discrepancy between the shortest and longest thread. In one embodiment, threads are merged when they contain a common output register.

21 Claims, 6 Drawing Sheets

LOAD BALANCING AND MERGING OF TESSELLATION THREAD WORKLOADS

FIELD

The described embodiments are generally related to the field of computer graphics. More particularly, embodiments relate to the load balancing and merging of computer graphics shader core workloads.

BACKGROUND

Three Dimensional (3D) models with low geometric detail may not fully convey the desired complexity of a 3D object. Higher detailed objects with a larger number of smaller polygons and an increased number of vertices are better suited for use in certain scenarios. However, using a finely detailed object defined by a larger number of vertices requires a larger amount of system resources than a coarsely detailed object. Accordingly, as the number of polygons and vertices increases in accordance with higher geometric detail, the 3D graphics engine will approach the limit of available processing capability and system bandwidth.

Graphics engines featuring support for hardware accelerated tessellation provide one solution by allowing the creation of geometrically complex 3D objects for use in the final 3D scene while storing and animating less complex objects using a relatively low number of polygons. Coarse geometric models are stored and animated, then the polygons of the geometric model are increased in detail by subdividing the polygons into smaller, more finely detail polygons during the rendering of the final 3D object, allowing an adaptable level of geometric detail. Hardware accelerated tessellation can be accomplished utilizing small programs known as "shaders" that execute on the graphics engine. Graphics applications generally supply shader programs in a high level language, along with polygons, textures, and other object data, as defined by one or more published Application Programming Interface (API). Such high level shaders are not hardware specific, so manufacturers of graphics hardware provide functionality to convert high level shader input into low level commands tailored for specific hardware. In some instances those commands are run in parallel on the graphics hardware when multi-threaded shader execution is supported.

Modern graphics engines utilize multiple parallel processors referred to as "shader cores" to execute multiple simultaneous threads of shader instructions. As high level shader programs are converted into low level commands, hardware specific optimizations are often included into the programs to better utilize the features of specific graphics hardware. Some graphics engines are designed explicitly to perform a large number of parallel operations using a larger number of shader cores, each executing a small number of instructions, while other graphics engines feature a smaller number of relatively more powerful shader cores capable of performing a larger number of instructions per core.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein are embodiments of a graphics engine with shader unit thread load balancing functionality that performs runtime merging of multiple execution threads. Hardware accelerated tessellation functionality is implemented utilizing programmable pipeline stages that allow custom, runtime configuration of graphics hardware utilizing programs compiled from a high level shader language that are executed using one or more shader execution cores. In one embodiment, the programs are executed in a multi-threaded manner and the graphics engine driver software balances the size and number of threads dispatched to the shader cores to enhance system performance.

Figure 1:
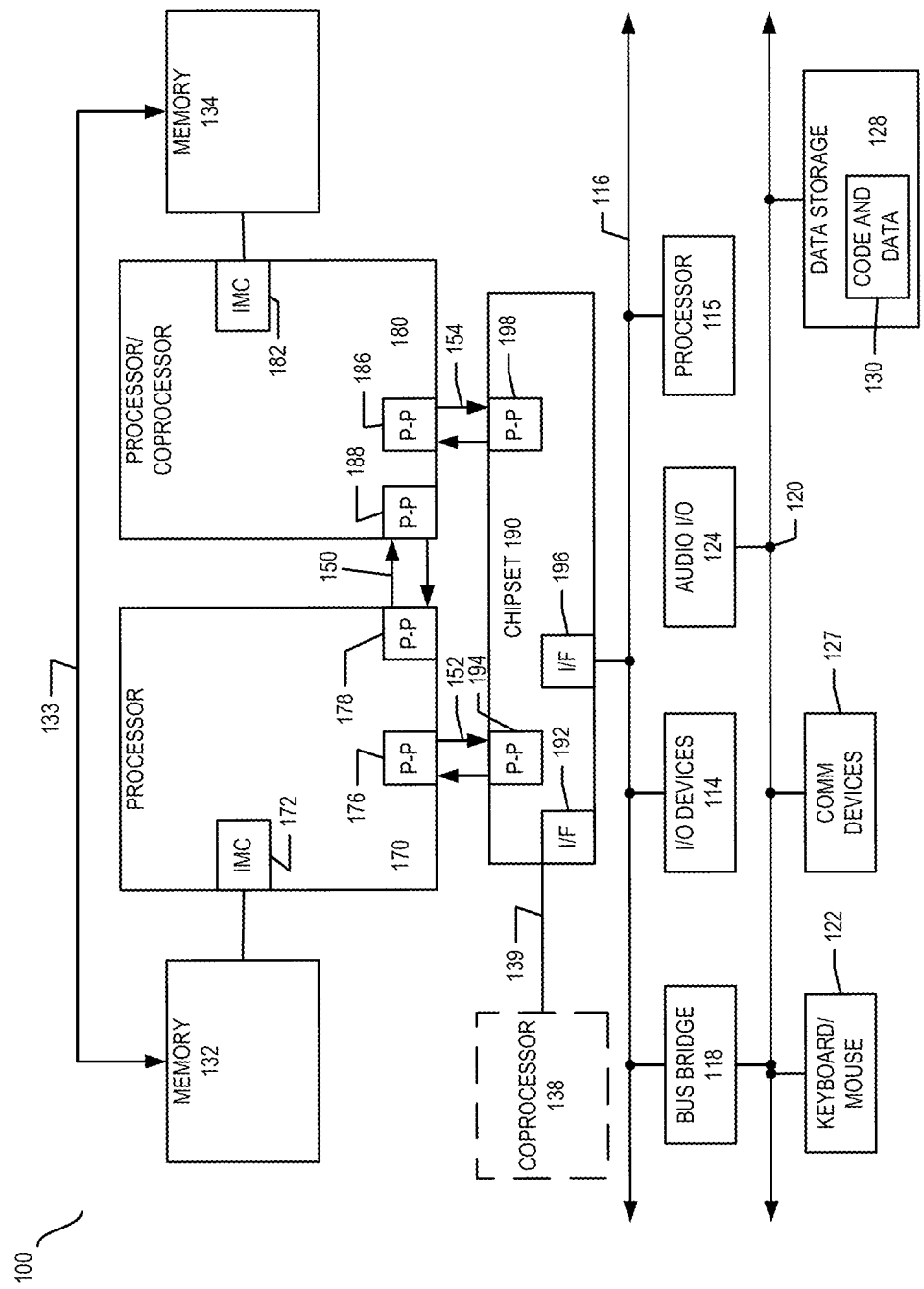
FIG. 1 is a block diagram of one embodiment of a system to perform load balancing and merging of shader execution thread workloads.

FIG. 1 illustrates a block diagram of an example system 100 in accordance with an embodiment of the present invention. As shown in FIG. 1, multiprocessor system 100 is a point-to-point interconnect system, and includes a first processor 170 and a second processor 180 coupled via a point-to-point interconnect 150. Processors 170 and 180 are shown including integrated memory controller (IMC) units 172 and 182, respectively. Processor 170 also includes as part of its bus controller units point-to-point (P-P) interfaces 176 and 178; similarly, second processor 180 includes P-P interfaces 186 and 188. Processors 170, 180 exchange information via a point-to-point (P-P) interface 150 using P-P interface circuits 178, 188. As shown in FIG. 1, IMCs 172 and 182 couple the processors respectively to a memory 132 and a memory 134, which are attached to the respective processors and coupled with the main system memory via a memory bus 133.

Processors 170, 180 exchange information with a chipset 190 via individual P-P interfaces 152, 154 using point to point interface circuits 176, 194, 186, 198. Chipset 190 may optionally exchange information with the coprocessor 138 via a high-performance interface 139. In one embodiment, the coprocessor 138 is a special-purpose processor, such as high-throughput Many Integrated Core (MIC) processor, a graphics engine, or the like. A shared cache (not shown) is included in both processors and optionally, outside of both processors and connected with the processors via P-P interconnect, such that either or both processors' local cache information is stored in the shared cache if a processor is placed into a low power mode.

Chipset 190 is coupled to a first bus 116 via an interface 196. In one embodiment, first bus 116 is a Peripheral Component Interconnect (PCI) bus, or a bus such as a PCI Express bus or another third generation I/O interconnect bus, although the scope of the present invention is not so limited. As shown in FIG. 1, various I/O devices 114 are coupled to first bus 116, along with a bus bridge 118 which couples first bus 116 to a low pin count bus 120. In one embodiment, one or more additional processor(s) 115 (e.g. MIC processors, graphics engines, Digital Signal Processors) are coupled to first bus 116. Various devices couple to the low pin count bus 120 including a keyboard and/or mouse 122, communication devices 127 and a storage unit 128 such as a disk drive or other mass storage device which includes instructions/code or data 130. Further, an audio I/O 124 can couple to the second bus 120. Note that other architectures are possible. For example, instead of the point-to-point architecture of FIG. 1, a system can implement a multi-drop bus or other such architecture.

Figure 2:
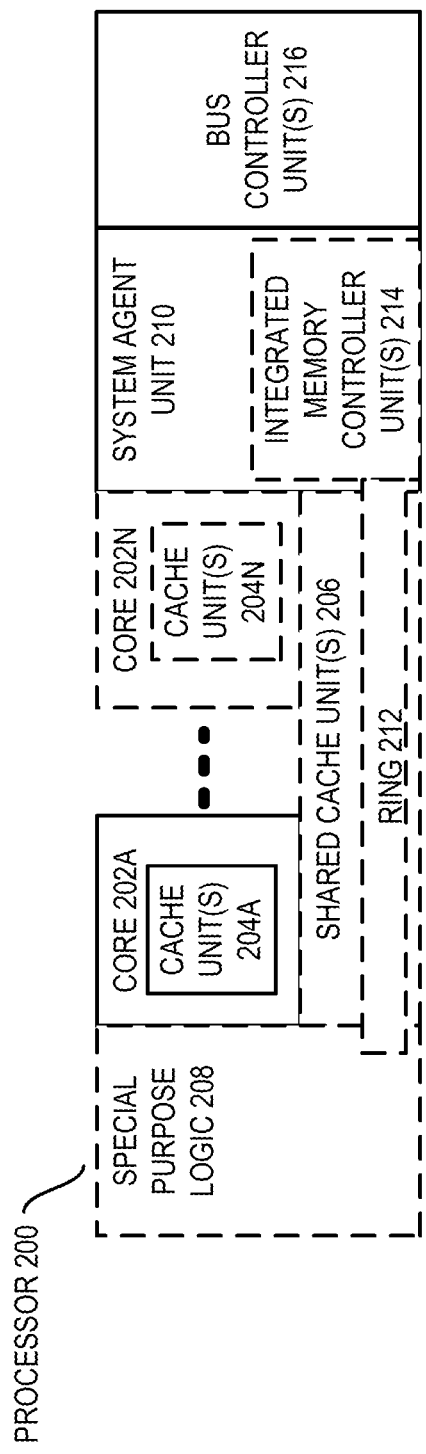
FIG. 2 is a block diagram of one embodiment of a processor with an integrated graphics unit.

Each of the processors 170 and 180 are some version of the processor 200 of FIG. 2, which shows a block diagram of a processor 200 that has one or more cores and an optional integrated memory controller and integrated graphics. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-202N, a set of one or more integrated memory controller unit(s) 214 in the system agent unit 210, and special purpose logic 208.

Different implementations of the processor 200 include: 1) a CPU with the special purpose logic 208 being integrated graphics and/or scientific (throughput) logic (which includes one or more cores), and the cores 202A-202N being one or more general purpose cores (e.g., general purpose in-order cores, general purpose out-of-order cores, a combination of the two); 2) a coprocessor with the cores 202A-202N being a large number of special purpose cores for graphics and/or scientific calculations; and 3) a coprocessor with the cores 202A-202N being a large number of general purpose in-order cores. Thus, the processor 200 can be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor can also be implemented across several chips, or entirely on one chip.

The memory hierarchy includes one or more levels of cache within the cores, a set of one or more shared cache units 206, and external memory (not shown) coupled to the set of integrated memory controller units 214. The set of shared cache units 206 includes one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments use any number of well-known techniques for interconnecting such units. In one embodiment, coherency is maintained between one or more cache units 206 and cores 202A-202N.

The system agent 210 includes those components coordinating and operating cores 202A-202N. The system agent unit 210 includes, for example, a power control unit (PCU) and a display unit. The PCU includes logic and components needed for regulating the power state of the cores 202A-202N and the integrated graphics logic 208. The display unit is for driving one or more externally connected displays. The cores 202A-202N can be homogenous or heterogeneous in terms of architecture instruction set. In one embodiment, cores 202A-202N use the same instruction set. Alternatively, two or more of the cores 202A-202N execute the same instruction set, while one or more cores execute a subset of that instruction set or a different instruction set. For example, in one embodiment, the processor 200 contains 4 cores 202A-202D to execute a general purpose instruction set, and also contains core 202E and, optionally, core 202F to execute an instruction set containing graphics specific instructions.

Figure 3:
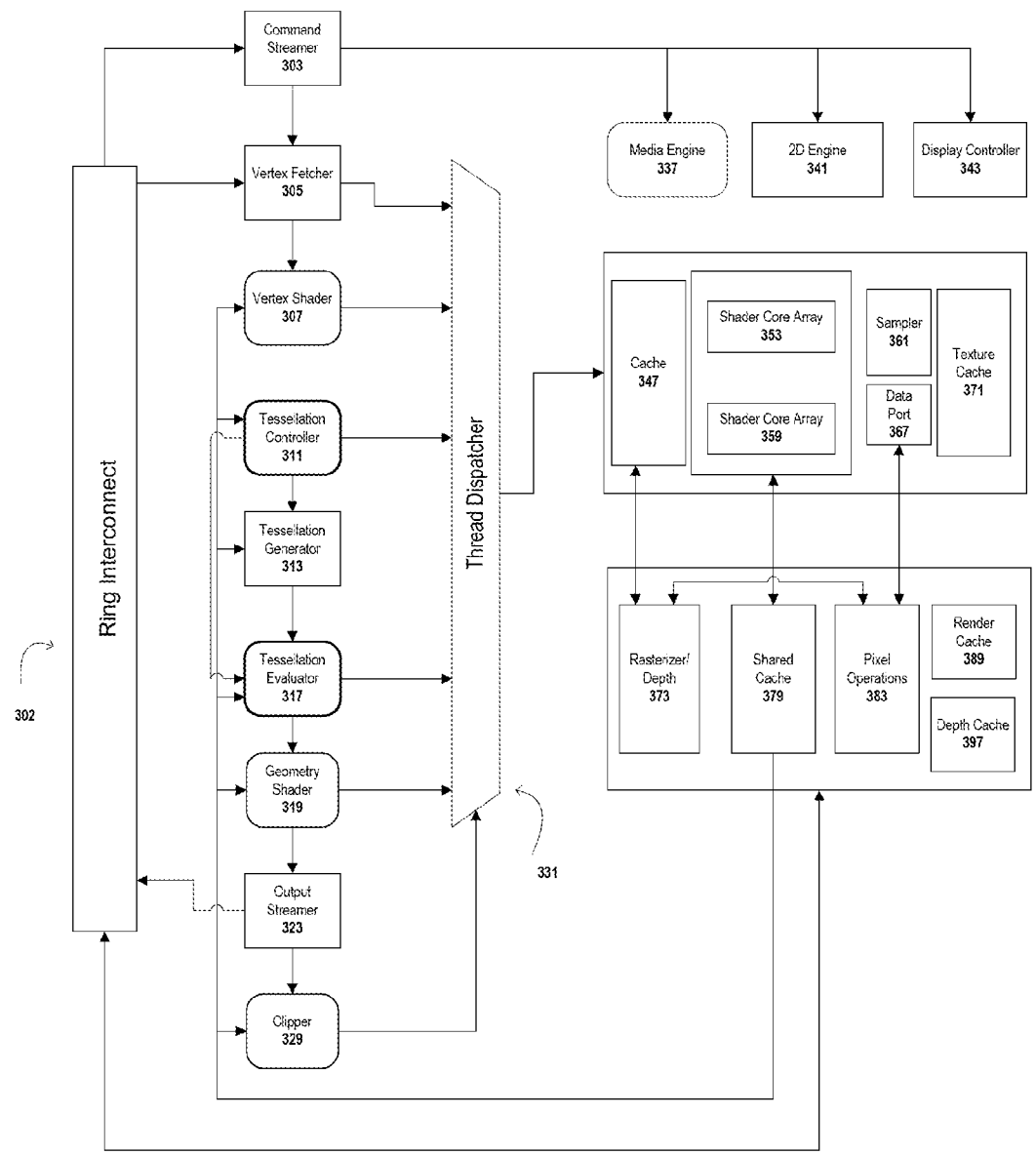
FIG. 3 is a block diagram of one embodiment of a graphics engine.

Embodiments of the invention include implementations of the processor 200 coupled to special purpose logic 208 configured as shown in FIG. 3. In one embodiment, graphics logic as in FIG. 3 contains a ring based interconnect unit 302 coupled to ring based interconnect unit 212. Commands coming from the ring based interconnect are interpreted by a command streamer 303 which supplies instructions to individual components of a 3D graphics pipeline. The command streamer 303 directs the operation of a vertex fetcher 305 component which reads vertex data from memory and executes 3D vertex level commands provided by the command streamer 303. The vertex fetcher 305 provides vertex data to a vertex shader 307 which performs coordinate space transformation and lighting operations to each vertex. The vertex fetcher 305 and vertex shader 307 execute command threads via a thread dispatcher 331 to acquire and process vertex data. Dispatched commands run via one or more shader arrays 353, 359 containing numerous special purpose cores to process commands from a programmable graphics pipeline.

The shader arrays 353, 359 have an attached cache 347 which is specific for each shader array 353, 359 or shared between the arrays. The cache can be configured as a data cache, an instruction cache, or a single cache which is partitioned to contain data and instructions in different partitions. Embodiments of the invention also feature tessellation components in the graphics pipeline to perform hardware accelerated tessellation of 3D objects. A programmable tessellation controller 311 and programmable tessellation evaluator 317 each execute one or more threads in sequence or concurrently on one or more special purpose cores contained within the shader core arrays 353, 349. The tessellation controller is programmed via a shader program referred to as a Hull Shader in the Direct3D API, or a Tessellation Control Shader in the OpenGL API. Different APIs program the tessellation controller differently, but shader programs from each API accept a group of vertices known as a "patch", which is processed to generate a set of tessellation control data and constant data. The control data is used by the tessellation evaluator 317 to interpret the generated vertices, while the tessellation controller 311 sends an output patch and patch constant data to the tessellation generator 313.

The tessellation generator 313 functions at the direction of the tessellation controller 311 and contains special purpose logic to generate a set of finely detailed geometric objects based on the coarse geometric model that is provided as input to the graphics pipeline. A tessellation evaluator 317 post-processes the set of geometric objects generated by the tessellation generator 313 to determine, among other things, the proper positioning coordinates for the vertices in the set of newly generated geometric objects. The tessellation evaluator 317 is configured by a shader program referred to as a tessellation evaluation shader program in the OpenGL API or a domain shader, as is known in the Direct3D API.

The geometric objects can then be processed by a geometry shader 319 via one or more threads dispatched to the shader core arrays 353, 359, or can proceed directly to the clipper 329. The geometry shader operates on entire geometric objects, rather than vertices or patches of vertices as in previous stages of the graphics pipeline. If the tessellation units 311, 313, 317 are not enabled, the geometry shader 319 receives input directly from the vertex shader 307. The geometry shader 319 is programmable by a geometry shader program to perform geometry tessellation if the tessellation units are disabled; however the geometry shader lacks the special purpose logic of the tessellation generator and will not perform as efficiently in most cases. If an application is to bypass the rasterizer, and needs access to vertex data, the processed vertex data is written to one or memory buffers via a ring bus interconnect 302 by an output streamer 323. Vertex data destined for the rasterizer is then processed by a clipper 329, which is either a fixed function clipper or a programmable clipper with both clipping and geometry shader functions. After the clipper, vertex data is dispatched over an interconnect bus to the render output pipeline, where a rasterizer 373 dispatches pixel shaders to convert the geometric objects into their per pixel representations. The render output pipeline is discussed in more detail below.

One embodiment of a graphics engine contains a media engine 337, 2D engine 341, and display controller 343 that contains special purpose fixed function logic and operates independently of the 3D pipeline, or alternatively contain programmable elements that use the shader cores for execution. The display controller 343 is generally connected to a display device (not shown) which can be an integrated display device, as in a laptop computer, or an external display device attached via an external display device connector such as, for example, a display port or thunderbolt connector.

The graphics engine of FIG. 3 has an interconnect bus to allow data and message passing amongst the major components of the graphics engine. In one embodiment the shader core array 353, 359 and associated caches 347, 371 and texture sampler unit 361 connect to this data bus through a data port 367 to perform memory access and communicate with render output pipeline components of the graphics engine. The render output pipeline contains a rasterizer and depth test component 373 which converts vertex based objects into their associated pixel based representation. An associated render cache 389 and depth cache 397 are also available in some embodiments. A pixel operations component 383 is available to perform pixel based operations on the data, though in some instances, pixel operations associated with 2D operations (e.g. bit block image transfers with blending) are performed by the 2D engine 341, or substituted at display time by the display controller 343 using overlay display planes. In one embodiment a cache 379 is available that is shared amongst all graphics components allowing the sharing of data among graphics engine components without the use of main system memory.

Embodiments of the invention are not specific to any one application programming interface, as graphics driver software is used to translate API calls specific to one graphics library to hardware specific commands. One embodiment provides support to the Open Graphics Library supported by the Khronos Group, the Direct3D library from the Microsoft Corporation, or, in one embodiment, both OpenGL and D3D. If tessellation support using these APIs is desired, then at least OpenGL 4.0 or Direct3D 11.0 would be optimal. Future APIs with a compatible 3D pipeline would also be supported if a mapping can be made from the render pipeline of that future API to the pipeline embodied in the graphics hardware.

Tessellation as embodied operates on a group of vertices known as patches that contain a group of vertices that will be tessellated. Patches of vertices will not have an explicit or implied geometric ordering, but provide a framework from which to interpolate vertices during tessellation. The Direct3D domain shader, or OpenGL tessellation evaluation shader, then transforms the generated vertices into a polygonal form. In one embodiment, an OpenGL vertex shader provides an array of vertices, along with attributes corresponding to various output variables. The tessellation control shader will then execute for each vertex and generate two sets of data; control variables that the tessellation evaluator will use to interpret the additional vertices generated by the tessellation generator and tessellation values that the tessellation generator will use to generate new vertices.

In one embodiment, tessellation control is enabled utilizing the Direct3D API. In Direct3D, a shader program named a hull shader controls the tessellation controller 311 to perform the tessellation control functionality that enables the patch to be tessellated by the tessellation generator 313. In the hull shader program, the vertices are processed to define the control points used by the domain shader to position the generated vertices after tessellation. Additionally, the hull shader specifies the tessellation factors that define how the new vertices are generated. The Direct3D API refers to the vertices in the vertex patch as control points. These vertices are the edge points of the control polygon the domain shader uses when positioning the new vertices. In OpenGL, the equivalent of the Direct3D hull shader is the tessellation control shader.

Figure 4:
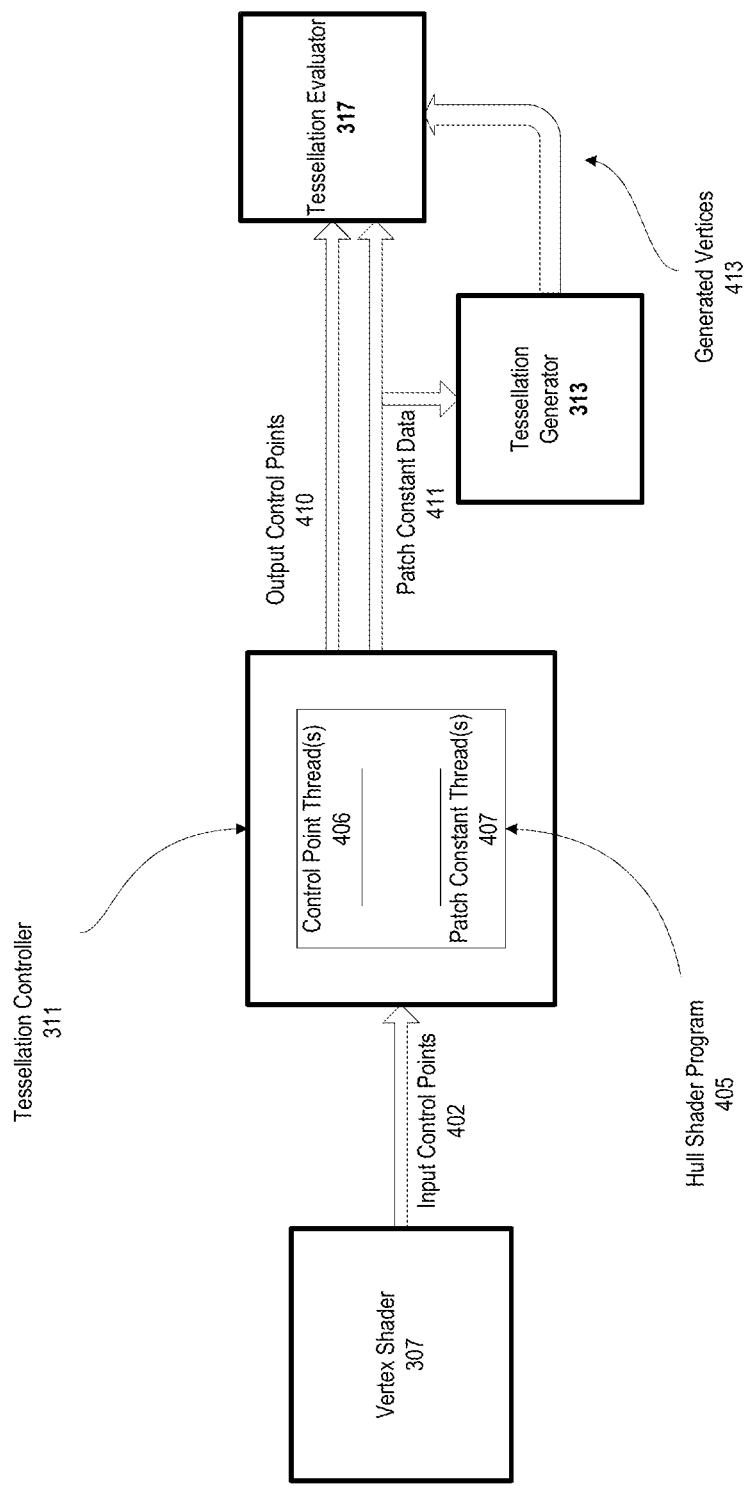
FIG. 4 is a flow diagram of one embodiment of a Hull Shader unit for multi-threaded shader execution.

FIG. 4 illustrates a flow diagram of a hull shader program as used in Direct3D, though the concepts are also applicable to the OpenGL tessellation control shader. In the Direct3D API, the hull shader is a program that operates the tessellation controller unit, such as the tessellation controller unit 311 of FIG. 3, to process a patch of vertices to determine tessellation factor data and control point data. The tessellation factor data is then used in a tessellation generator (e.g. tessellation generator 313) to determine how many new vertices to interpolate from the vertex patch. The control point data is used by a tessellation evaluator (e.g. tessellation evaluator 317) to place the new vertex data into the 3D scene. For example, the vertex shader 307 performs transform and lighting operations on vertices at the direction of a vertex program. Patches of these vertices then pass into the tessellation controller 311 to be processed by the hull shader program 405. The hull shader 405 generates two phases of threads consisting of control point threads 406 and patch constant threads 407. The threads of each phase are generally executed in parallel. The control point phase is executed once for each output control-point and readings input control points 402 to generate one output control point 410 per execution. The patch-constant phase operates once per patch, and generates the patch constant data 411 (e.g. outer and inner tessellation factors) that are used as input to the tessellation generator 313 and tessellation evaluator 317. Though the patch-constant phase only executes once per patch, it is possible to execute multiple instances of the patch-constant logic in parallel during the patch-constant phase.

The tessellation generator 313 generates new vertices by creating new primitives inside of the patch of vertices. In one embodiment, triangles, quads (e.g. rectangles and squares), or lines can be drawn within the vertex patch and then new vertices are generated by subdividing the polygons to make new, smaller polygons. New vertices are then interpolated based on the smaller polygons. For example, a patch containing four vertices can be drawn as a quad primitive, and then subdivided into two triangles. Those two triangles are then subdivided into smaller triangles based on the tessellation factors. Alternately, a quad can be subdivided by a tile of smaller quads. Numerous configurations are possible. The inner tessellation factor controls the number of primitives that are generated within the patch of vertices, and the outer tessellation level controls the number of times to subdivide along the edge of the vertex patch. The vertices generated by the tessellation generator are based on the vertex patch, without regard to the larger set of vertices in the geometric object. The output control points 410 define how the tessellation evaluator 317 transforms the newly generated vertices for use within the 3D scene.

Each control point will be referenced with a control point identification number to allow the shader program to determine which control point is currently being evaluated. In one embodiment, the number of patch constant phase threads that are dispatched to hardware is runtime managed based on the current state of the graphics hardware, including, for example, the number of available shader cores and number of shader units attempting to dispatch threads to the shader cores at any one time. An additional consideration is the length and subsequent execution time of each shader thread. Generally, though not universally, the execution time of a shader thread is proportional to the number of operations to be performed within the thread. However, having to execute a multitude of very short threads can impact overall performance because of the overhead introduced with each additional thread, and because each thread used by one shader unit limits the number of free thread contexts available for other shader units. Accordingly, performance improvements can be seen when combining a large number of shorter threads into a smaller number of longer threads, as long as the individual thread size is not allowed to grow beyond a certain hardware specific threshold.

For example, if the tessellation controller dispatches enough threads to the shader array to prevent vertex shader or geometry shader operations, then overall pipeline performance can be limited. Additionally, it can be beneficial to merge operations into a common thread to exploit data parallelism via the use of Single Instruction Multiple Data (SIMD) operations. SIMD operations can perform a single instruction across multiple vectors of data and allow parallel operations on information without requiring additional execution threads. The ability to limit instruction threads is desirable because the programmable elements on the data pipeline can, from time to time, attempt to dispatch more hardware execution threads to the shader array than the shader array infrastructure can allow, slowing pipeline operation speed. This is notable in the instance that numerous small threads are dispatched from multiple shader units on the data pipeline and delay the execution of larger, more critical threads. For example, if the tessellation controller dispatches enough threads to the shader array to prevent vertex shader or geometry shader operations, then overall pipeline performance can be limited.

Figure 5:
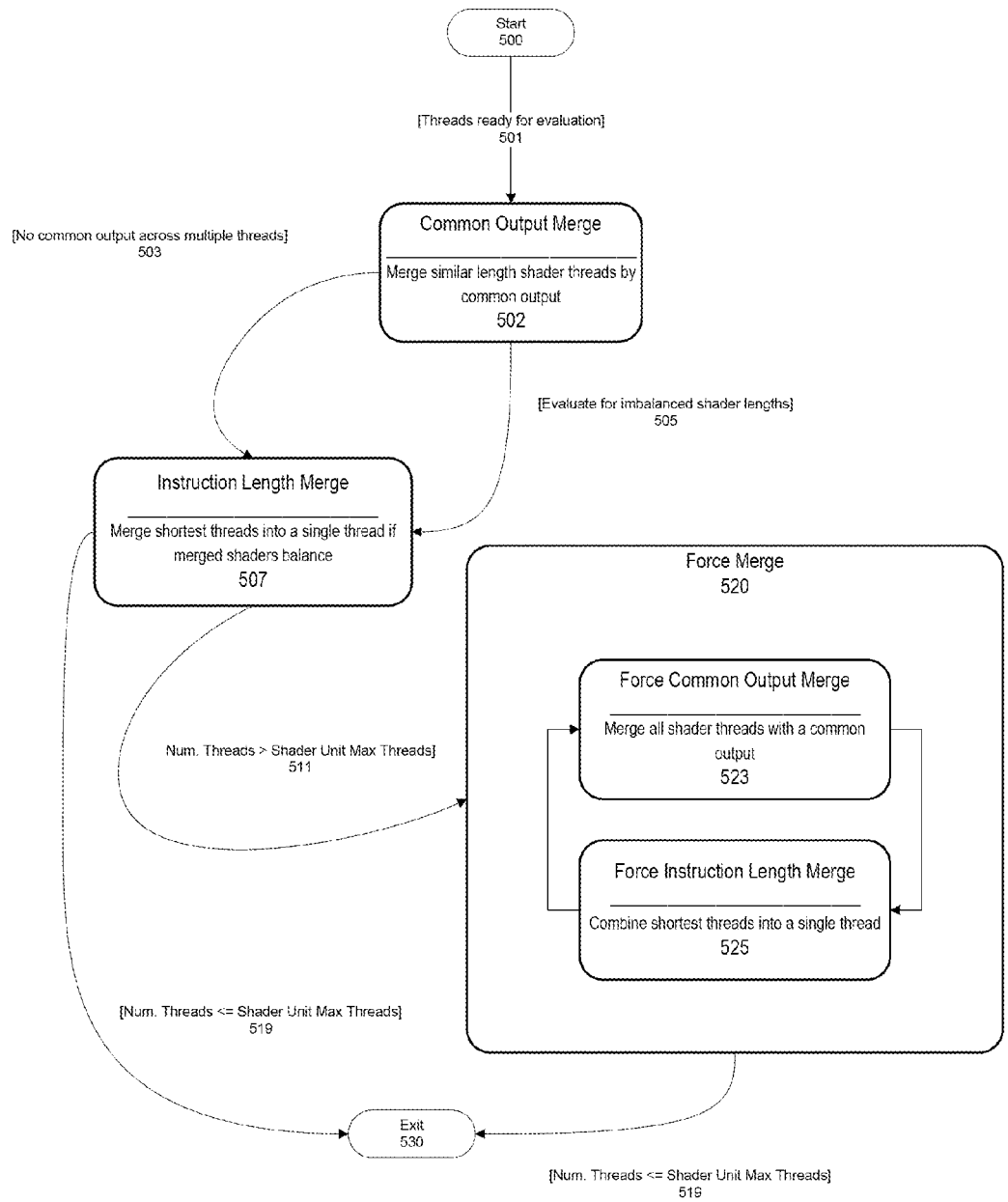
FIG. 5 is a state diagram of one embodiment of a method of load balancing and merging multiple shader execution threads.

FIG. 5 is a state diagram illustrating an embodiment of a method for merging and load balancing Hull Shader threads. Embodiments of this method can be quantized into 4 general operations that combine multiple threads based on the state of the graphics engine when the thread merging is occurring. In one embodiment, the method is implemented at shader thread dispatch time when scheduling shaders to run on the shader cores. Alternatively, in one embodiment, the shader threads are merged at compile time by the back end shader compiler. When an event 501 occurs that signals the shaders are ready for evaluation, the device will move from the start state 500 into a common output merge state 502 where threads of similar length are merged by common output. The registers used by low level shader programs hold vector data split into different channels. It is possible for different threads to write to different channels of the same register. Merging threads that write to different channels of the same output register can reduce general bus traffic by eliminating multiple output data writes and enhance system performance. Additionally, merging these operations into a common thread allows the graphics engine to exploit vector data parallelism using Single Instruction Multiple Data operations that allows a shader core to perform the same instruction in parallel across multiple vectors of data.

If there are no common outputs across the various threads, trigger event 503 occurs and the device transitions to the Instruction Length Merge 507 state. Alternatively, the device can merge similar length shaders and find there is still a shader length imbalance across the set of threads for a given shader unit, which will trigger transition 505, also to the Instruction Length Merge 507 state, but in that instance, the device has state information that indicates whether a common output declaration exists within the multiple threads that was not used to merge those threads, which will dictate the force merge operation in the event threads are force merged to conform to a thread limit imposed on a particular shader unit. Force merge scenarios will be discussed in further detail below.

The Instruction Length Merge 507 state will perform an action that merges certain threads in a set of threads to transform a shader program containing several threads with few instructions into a program with a smaller number of threads, while retaining the same functionality. If at this point the shader unit program has been merged by length, and merged or evaluated for common output declarations, and the number of threads in the program do not exceed the limit set for threads from that shader unit, trigger condition 519 will occur and the Instruction Length Merge 507 state will transition to Exit process 530, which continues with the shader program's execution process or evaluates a new set of threads from a different shader unit program.

In one embodiment, the number of threads that dispatch from a single shader unit can be limited dynamically by the hardware or to a value set by the graphics driver. In this embodiment, a minimum amount of thread availability is maintained to certain shader units by placing limits on other shader units, preventing a scenario where, for example, a critical calculation cannot dispatch to the shader cores due to a lack of available threads in which to execute the shader unit instructions. Threads from a shader unit can be combined so that the same instructions are dispatched in a fewer number of threads. If a shader unit max thread limit is imposed and the current number of threads exceeds the limit, condition 511 occurs and the device transitions to the Force Merge 520 super-state where, if there exists a common output among the registers that was not previously merged due to thread balance issues, state 523 will merge threads while disregarding shader balance issues. In this action, a hypothetical shader of 10 lines sharing a common output with a shader of 50 lines will be merged, where the Common Output Merge 502 state would have bypassed those shaders because of the latency hiding benefit that could have been derived. If there are no common outputs, state 525 combines as many shaders as possible into a smaller number of longer threads until the number of threads is below the maximum number of allowed threads for that shader unit, at which condition 519 will trigger a transition to Exit process 530.

During the execution of a 3D application utilizing shader code written in a high level language, the high level shader program is converted or assembled into one or more low level shader languages, including shader byte-code, shader assembly, or operation codes for hardware specific instructions. Assembly shader code is used as an example in the tables below; the shader assembly code illustrates the discrete phases and multi-threaded logic of a shader program. While examples of shader merge operations will be illustrated using assembly level shader code, embodiments of the invention are not limited to operating at the assembly level and may operate on other stages of execution.

A shader program for a tessellation controller (e.g. tessellation controller 313 of FIG. 3) consists of a per-control point phase and a per-patch patch constant phase, as illustrated in FIG. 4. Calculations for dynamic level of detail, or other tessellation techniques or optimizations are performed in this phase, however, in some instances no computations are made, and an individual phase will pass-through input data to the appropriate output registers without making modifications.

Examples of assembly language for a tessellation control shader are shown in Tables I-IV below. Table I shows a portion of a hull shader program of Direct3D used to control the tessellation controller 311 of FIG. 3.

TABLE I

Low level shader with three threads.

| | |
|---|---|
| 101 | hs_fork_phase |
| 102 | dcl_input vicp[32][2].x |
| 103 | dcl_output o6.x |
| 104 | mov o6.x, vicp[0][2].x |
| 105 | ret |
| 106 | hs_fork_phase |
| 107 | dcl_input vicp[32][2].y |
| 108 | dcl_output o6.y |
| 109 | mov o6.y, vicp[0][2].y |
| 110 | ret |
| 111 | hs_fork_phase |
| 112 | dcl_input vicp[32][2].z |
| 113 | dcl_output o6.z |
| 114 | mov o6.z, vicp[0][2].z |
| 115 | ret |

In Table I, the x, y and z components of the input control point register are addressed in parallel. In embodiments containing shader arrays with a large number of less powerful shader cores, improved performance is realized in some instances by performing as many operations in parallel as possible. For example, in Table I a first shader thread beginning on line 101 writes to output o6.x, a second shader thread on line 106 writes to output o6.y, and a third shader thread on line 111 writes to output o6.z. In one embodiment, more powerful shader cores with a complex instruction set are used and a single shader core is able to execute instructions faster than several less powerful shader cores. In that instance, performance improvements are seen when several threads of instructions are combined into a smaller number of threads. For example, it is possible to merge the three shader computations in Table I to output only once to o6 across channels x, y, and z. At this state this merge operation is limited to cases that will not result in widely disproportional shader lengths across a set of threads. For example, a shader with 10 instructions generally will not be merged with a shader with 50 instructions because the latency created by the output write of the shorter shader is hidden by the longer shader's additional 40 instructions. The example shader threads illustrated in Table I are similar in size and contain a common output declaration, so these threads can be merged into one thread, as demonstrated in Table II below.

TABLE II

Merged low level shader with one thread.

| | |
|---|---|
| 201 | hs_fork_phase |
| 202 | dcl_input vicp[32][2].xyz |
| 203 | dcl_output o6.xyz |

TABLE II-continued

Merged low level shader with one thread.

| | |
|---|---|
| 204 | mov o6.xyz, vicp[0][2].xyz |
| 205 | ret |

In the shader assembly code of Table II, the instructions from the three threads shown in Table I are executed in one thread with a single set of instructions that copies three channels of the vicp input register to three channels of the o6 output register. In one embodiment, the instruction on line 204 will perform more efficiently than the three threads of instructions of Table I.

The above technique is limited to instances where multiple threads operate on multiple channels of the same output register. If the shader program does not contain multiple threads that write to a common output, alternate merge techniques can combine threads based on the number or type of instructions performed in each thread. For example, in one embodiment, related instructions that perform similar functionality are combined into a single thread at shader compile time, which enhances threading efficiency by grouping common operations and reducing the number of threads pending execution. Additionally, merging related instructions exposes the instructions to additional back end compiler optimizations, increasing the runtime efficiency of the compiled code. As shown in FIG. 5, this operation can be performed in addition to a common output merge or as an alternative to a common output merge if there are no common outputs across the various threads.

An example of a shader program with five threads is shown in Table III below. In one embodiment, three of the threads illustrated below will be combined into a single thread a by the shader compiler.

TABLE III

Low level shader with five threads.

| | |
|---|---|
| 301 | hs_fork_phase |
| 302 | dcl_output_siv o0.x, finalQuadUeq0EdgeTessFactor |
| 303 | mov o0.x, cb2[4].w |
| 304 | ret |
| 305 | hs_fork_phase |
| 306 | dcl_output_siv o1.x, finalQuadVeq0EdgeTessFactor |
| 307 | mov o1.x, cb2[4].w |
| 308 | ret |
| 309 | hs_fork_phase |
| 310 | dcl_output_siv o2.x, finalQuadUeq1EdgeTessFactor |
| 311 | mov o2.x, cb2[4].w |
| 312 | ret |
| 313 | hs_fork_phase |
| 314 | dcl_output_siv o3.x, finalQuadVeq1EdgeTessFactor |
| 315 | mov o3.x, cb2[4].w |
| 316 | ret |
| 317 | hs_fork_phase |
| 318 | dcl_input vPrim |
| 319 | dcl_output o22.xyzw |
| 320 | dcl_temps 1 |
| 321 | iadd r0.x, vPrim, cb3[0].x |
| 322 | ishl r0.x, r0.x, l(1) |
| 323 | ld_indexable(buffer)(uint,uint,uint,uint) r0.xyzw, r0.xxxx, t0.xyzw |
| 324 | iadd r0.xyzw, r0.xyzw, l(−3, −3, −3, −3) |
| 325 | mov o22.x, cb0[r0.x + 1024].x |
| 326 | mov o22.y, cb0[r0.y + 1024].x |
| 327 | mov o22.z, cb0[r0.z + 1024].x |
| 328 | mov o22.w, cb0[r0.w + 1024].x |
| 329 | ret |

In Table III, on lines 301, 305, 309, and 313, four shader threads each declare a separate output register that contains an edge tessellation factor system-value parameter. This shader program sets different edge tessellation factors in different output registers in each thread. The threads do not share an output register utilizing different component masks, so cannot be merged by a common output. However, their operations can be combined into a single thread without exceeding the length of the longest thread, which begins on line 317. In one embodiment, outputs to registers containing related system variables that occur across multiple threads are grouped and executed as a single thread. An example of an assembly shader program demonstrating the executed logic after shader instruction merging is illustrated in Table IV.

TABLE IV

Merged low level shader with two threads.

```
401  hs_fork_phase
402  dcl_output_siv o0.x, finalQuadUeq0EdgeTessFactor
403  dcl_output_siv o1.x, finalQuadVeq0EdgeTessFactor
404  dcl_output_siv o2.x, finalQuadUeq1EdgeTessFactor
405  dcl_output_siv o3.x, finalQuadVeq1EdgeTessFactor
406  mov o0.x, cb2[4].w
407  mov o1.x, cb2[4].w
408  mov o2.x, cb2[4].w
409  mov o3.x, cb2[4].w
410  ret
411  hs_fork_phase
412  dcl_input vPrim
413  dcl_output o22.xyzw
414  dcl_temps 1
415  iadd r0.x, vPrim, cb3[0].x
416  ishl r0.x, r0.x, l(1)
417  ld_indexable(buffer)(uint,uint,uint,uint) r0.xyzw, r0.xxxx, t0.xyzw
418  iadd r0.xyzw, r0.xyzw, l(-3, -3, -3, -3)
419  mov o22.x, cb0[r0.x + 1024].x
420  mov o22.y, cb0[r0.y + 1024].x
421  mov o22.z, cb0[r0.z + 1024].x
422  mov o22.w, cb0[r0.w + 1024].x
423  ret
```

In the shader program with merged threads illustrated in Table IV, the edge tessellation value writes are all grouped into a single thread, as opposed separate, smaller threads. Additionally, the four merged threads do not exceed the length of the longest thread in the program, which begins on line 411

Figure 6:
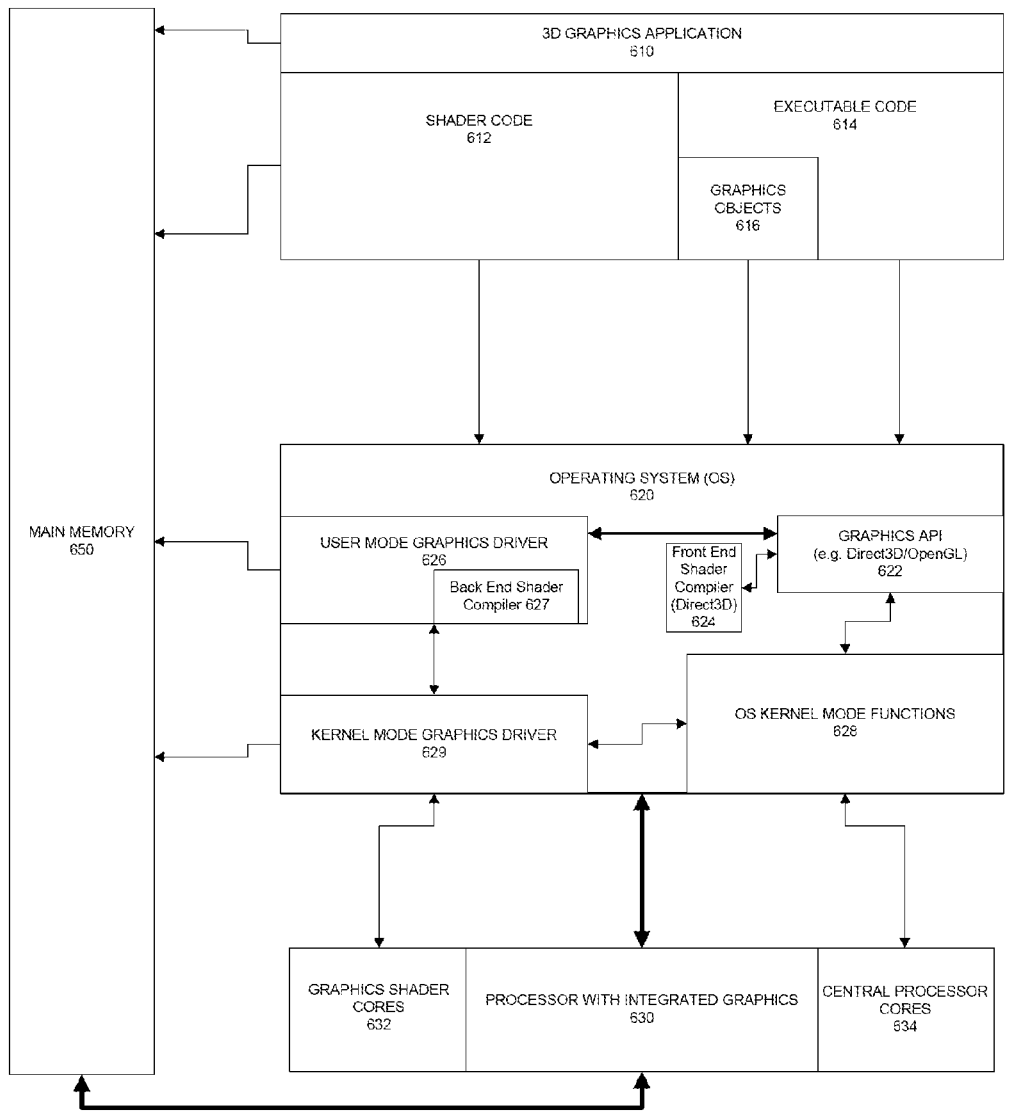
FIG. 6 is a block diagram of one embodiment of a data processing system which can perform load balancing and merging of shader execution thread workloads.

FIG. 6 illustrates an example of a data processing system which includes embodiments of the invention. In one embodiment, a 3D graphics application 610 runs in main system memory 650 and contains shader code 612 written in a high level shader language, and processor executable code for execution on the central processor cores 634. The 3D graphics application also includes graphics objects 616 defined by vertex data. An operating system 620 includes a Graphics Application Programming Interface (API) 622, such as Direct3D or OpenGL which provides an interface for the 3D graphics application.

In one embodiment, the operating system 620 is a Microsoft Windows operating system from the Microsoft Corporation or, alternately, is a UNIX based operating system. When utilizing the Direct3D API, the operating system 620 contains a front end shader compiler 624 to convert shaders written in a high level shader language to shaders represented by a low level shader language. In one embodiment, however, the OpenGL API is enabled, which passes the high level shader directly to the user mode graphics driver 626 which is capable of performing high level shader compilation. The user mode graphics driver 626 contains a back end shader compiler 627 to convert the shader code into a hardware specific representation. In one embodiment, the methods discussed above are implemented in the user mode graphics driver 626, or back end shader compiler 627 as appropriate under the circumstances, depending on the capability or configuration of the graphics engine. Embodiments of the processor with integrated graphics 630 can also perform the thread management logic within the graphics pipeline hardware or microcode.

The user mode graphics driver uses OS kernel mode functions 628 to communicate with a kernel mode graphics driver 629, and the kernel mode graphics driver 629 communicates with a processor which, in one embodiment, is a processor with integrated graphics 630 which contains general purpose processor cores 634 and graphics specific shader execution cores 632. In the alternative, a discrete, non-integrated graphics core attached to the processor via a bus is also possible. In one embodiment, all or part of the threading enhancement logic is implemented in one or more of the graphics specific shader cores 632, or within the thread dispatch logic 331 of the graphics engine 630, as illustrated in FIG. 3.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface. A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A machine implemented method comprising:
analyzing a set of shader execution threads from the shader unit of a graphics pipeline to find a subset of threads that include logic operations on the same output register;
merging the subset of threads that include logic operations that write to a common output register;
combining shader unit instructions from multiple threads in a set of threads into a combined shader unit thread;
dispatching the set of shader execution threads to an array of graphics engine shader cores; and
executing the instructions in the set of threads using one or more graphics engine shader cores.

2. The method of claim 1 wherein shader unit instructions from multiple threads are combined when the combined thread will not exceed the longest shader unit thread in the set of shader unit threads.

3. The method of claim 1 wherein the graphics engine execution threads configure a graphics engine having logic for performing geometric object tessellation.

4. The method of claim 1 wherein merging the subset of threads that include logic operations that write to a common output register reduces the number of shader unit threads in the set of shader execution threads and enables output register write balancing.

5. The method of claim 4 wherein combining shader unit instructions from multiple threads in a set of threads into a combined shader unit thread balances the length of instructions across shader unit threads in the set of shader execution threads.

6. An article of manufacture comprising:
a non-transitory machine-storage medium including data that, when accessed by a machine, cause the machine to perform operations comprising:
analyzing a set of shader execution threads from the shader unit of a graphics pipeline to find a subset of threads that include logic operations on the same output register;
reducing the number of shader unit threads in the set of shader execution threads by merging the subset of threads that include logic operations that write to a common output register;
balancing the length of instructions across shader unit threads in the set of shader execution threads by combining shader unit instructions from multiple threads in a set of threads into a combined shader unit thread when the combined shader unit thread is not longer than the longest shader unit thread in the set of shader unit threads;
dispatching the set of shader execution threads to an array of graphics engine shader cores; and
executing the instructions in the set of shader execution threads using one or more graphics engine shader cores.

7. The article of manufacture of claim 6 wherein the machine-storage medium further includes data that cause the machine to perform operations comprising limiting the number of shader unit threads dispatched from a shader unit.

8. The article of manufacture of claim 6 wherein the machine-storage medium further includes data that cause the machine to perform operations comprising configuring the graphics engine to perform tessellation operations on the vertices of geometric objects.

9. The article of manufacture of claim 8 wherein the machine-storage medium further includes data that cause the machine to perform operations comprising calculating edge tessellation factors to program a tessellation primitive generator.

10. A processor comprising:
a graphics engine having multiple shader execution cores and a graphics pipeline comprised of multiple programmable shader units, to
analyze a set of shader execution threads from the shader unit of a graphics pipeline to identify the subset of threads that write to the same output register;
combine the subset of threads, wherein multiple threads in the subset of threads include logic operations that write to a common output register;
group shader unit instructions from multiple threads in a set of threads into a combined shader unit thread, wherein the combined shader unit thread is less than or equal in length with the longest shader unit thread in the set of shader unit threads;
dispatch the set of threads to an array of graphics engine shader cores; and
execute instructions from the set of threads using one or more graphics engine shader cores.

11. The processor of claim 10 wherein the graphics pipeline of the graphics engine comprises programmable shader units to tessellate geometric objects.

12. The processor of claim 11 wherein the graphics engine shader cores calculate tessellation factors to program a tessellation primitive generator.

13. The processor of claim 10 wherein the graphics engine further comprises a register to store a limit to the number of graphics engine execution threads a shader unit may dispatch to the shader cores.

14. The processor of claim 10 wherein a limit on the number of graphics engine execution threads a first shader unit dispatches to the shader cores allows a second shader unit to dispatch additional threads to the shader cores.

15. The processor of claim 10 wherein a limit of the number of graphics execution threads a shader unit dispatches to the shader cores does not limit the number of instructions a shader unit can dispatch to the shader cores.

16. A system comprising:
one or more processors having one or more processing cores;
a main system memory coupled to the one or more processors, to store graphics shader unit instructions; and
a graphics engine having one or more shader execution cores, coupled to the one or more processors and the main system memory, the system to
analyze a set of shader execution threads from the shader unit of a graphics pipeline to find multiple threads that write to the same output register,
combine shader unit threads when multiple threads in a set of threads include logic operations that write to a common output register,
combine shader unit instructions from multiple threads in a set of threads when the combined shader unit thread is not longer than the longest shader unit thread in the set of shader unit threads,
dispatch the threads to an array of graphics engine shader cores, and
execute the instructions in the threads.

17. The system of claim 16 wherein the main system memory stores data representing geometric objects.

18. The system of claim 17 wherein the graphics engine further comprises a graphics pipeline to tessellate geometric objects.

19. The system of claim 18 wherein a graphics engine shader core executes a shader instruction across multiple channels of a graphics output register.

20. The system of claim 18 further comprising a back end shader compiler, to merge multiple graphics engine shader unit threads during compilation.

21. The system of claim 20 wherein the back end shader compiler limits the number of graphics engine execution threads dispatched by a shader unit on the graphics pipeline.

* * * * *